United States Patent
Takeda et al.

(10) Patent No.: US 11,196,531 B2
(45) Date of Patent: Dec. 7, 2021

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 59 days.

(21) Appl. No.: 16/622,171

(22) PCT Filed: Jun. 13, 2017

(86) PCT No.: PCT/JP2017/021867
§ 371 (c)(1),
(2) Date: Dec. 12, 2019

(87) PCT Pub. No.: WO2018/229879
PCT Pub. Date: Dec. 20, 2018

(65) Prior Publication Data
US 2020/0127802 A1  Apr. 23, 2020

(51) Int. Cl.
*H04L 5/14* (2006.01)
*H04L 5/00* (2006.01)
(Continued)

(52) U.S. Cl.
CPC ............ *H04L 5/14* (2013.01); *H04L 5/001* (2013.01); *H04L 5/0055* (2013.01);
(Continued)

(58) Field of Classification Search
CPC ......... H04L 5/14; H04L 5/001; H04L 5/0055; H04L 5/0082; H04L 27/32; H04W 28/06
(Continued)

(56) References Cited

U.S. PATENT DOCUMENTS

2013/0114562 A1* 5/2013 Seo ................. H04W 52/16
370/329
2014/0348146 A1* 11/2014 Malkamaki ......... H04W 72/044
370/337
(Continued)

FOREIGN PATENT DOCUMENTS

CA     2996405 A1   3/2017

OTHER PUBLICATIONS

International Search Report issued in PCT/JP2017/021867 dated Jul. 18, 2017 (1 page).
(Continued)

*Primary Examiner* — Danh C Le
(74) *Attorney, Agent, or Firm* — Osha Bergman Watanabe & Burton LLP

(57) ABSTRACT

The present invention is designed so that multiple UL signals of varying RATs are transmitted properly in non-stand-alone radio communication systems. A user terminal has a transmission section that transmits a first uplink (UL) signal of a first radio access technology (RAT) and a second UL signal of a second RAT, at different times, and a control section that controls switching between a first time, which is used to transmit the first UL signal using a first UL carrier of the first RAT, and a second time, which is used to transmit the second UL signal using a second UL carrier of the second RAT.

10 Claims, 15 Drawing Sheets

(51) Int. Cl.
*H04L 27/32* (2006.01)
*H04W 28/06* (2009.01)

(52) U.S. Cl.
CPC .......... *H04L 5/0082* (2013.01); *H04L 27/32* (2013.01); *H04W 28/06* (2013.01)

(58) Field of Classification Search
USPC ................. 370/329, 310.2; 455/550.1, 552.1
See application file for complete search history.

(56) References Cited

U.S. PATENT DOCUMENTS

| | | | | |
|---|---|---|---|---|
| 2015/0219184 | A1* | 8/2015 | Brevick | F16F 15/1457 74/604 |
| 2016/0029222 | A1* | 1/2016 | Su | H04L 65/1069 370/329 |
| 2016/0119824 | A1* | 4/2016 | Jin | H04W 8/24 455/436 |
| 2016/0295502 | A1* | 10/2016 | Yoon | H04W 52/0216 |
| 2017/0019944 | A1* | 1/2017 | Teng | H04L 5/0055 |
| 2017/0302419 | A1* | 10/2017 | Liu | H04L 5/0082 |
| 2017/0347297 | A1* | 11/2017 | Li | H04W 40/02 |
| 2018/0206188 | A1* | 7/2018 | Nam | H04W 48/16 |
| 2018/0332603 | A1 | 11/2018 | Takeda et al. | |
| 2020/0099560 | A1* | 3/2020 | Li | H04W 16/06 |

OTHER PUBLICATIONS

Written Opinion of the International Searching Authority issued in in PCT/JP2017/021867 dated Jul. 18, 2017 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
LG Electronics; "Discussion on multi-carrier operation between LTE and NR"; 3GPP TSG RAN WG1 Meeting #86bis, R1-1609238; Lisbon, Portugal; Oct. 10-14, 2016 (4 pages).
Extended European Search Report issued in counterpart European Patent Application No. 17913498.6., dated Nov. 20, 2020 (7 pages).

* cited by examiner

| UL/DL CONFIGURATION | \multicolumn{10}{c}{SUBFRAME n} |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D DL SUBFRAME
U UL SUBFRAME
S SPECIAL SUBFRAME

FIG. 4

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | 4 | – | – | 6 | – | 4 |
| 1 | – | – | 7,6 | 4 | – | – | – | 7,6 | 4 | – |
| 2 | – | – | 8,7,4,6 | – | – | – | – | 8,7,4,6 | – | – |
| 3 | – | – | 7,6,11 | 6,5 | 5,4 | – | – | – | – | – |
| 4 | – | – | 12,8,7,11 | 6,5,4,7 | – | – | – | – | – | – |
| 5 | – | – | 13,12,9,8,7,5,4,11,6 | – | – | – | – | – | – | – |
| 6 | – | – | 7 | 7 | 5 | – | – | 7 | 7 | – |

FIG. 5

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 4 | 6 | — | — | — |
| 1 | — | 6 | — | 4 | 4 | — | 6 | — | — | 4 |
| 2 | — | — | — | 4 | — | — | — | — | 4 | — |
| 3 | 4 | — | — | — | — | — | — | — | 4 | 4 |
| 4 | — | — | — | — | — | — | — | — | 4 | 4 |
| 5 | — | — | — | — | — | — | — | — | 4 | — |
| 6 | 7 | 7 | — | — | — | 7 | 7 | — | — | 5 |

FIG. 6

| UL/DL CONFIGURATION | \multicolumn{10}{c}{SUBFRAME n} |
|---|---|---|---|---|---|---|---|---|---|---|

| UL/DL CONFIGURATION | 0 | 1 | 2 | 3 | 4 | 5 | 6 | 7 | 8 | 9 |
|---|---|---|---|---|---|---|---|---|---|---|
| 0 | – | – | 6,5 | 5,4 | 4 | – | – | 6,5 | 5,4 | 4 |
| 1 | – | – | 7,6 | 6, 5, 4 | – | – | – | 7,6 | 6,5,4 | – |
| 2 | – | – | 8, 7, 6, 5, 4 | – | – | – | – | 8,7,6,5,4 | – | – |
| 3 | – | – | 11, 10, 9, 8, 7, 6 | 6,5 | 5,4 | – | – | – | – | – |
| 4 | – | – | 12, 11, 10, 9, 8, 7 | 7, 6, 5, 4 | – | – | – | – | – | – |
| 5 | – | – | 13, 12, 11, 10, 9, 8, 7, 6, 5, 4 | – | – | – | – | – | – | – |
| 6 | – | – | 8,7 | 7,6 | 6,5 | – | – | 7 | 7,6,5 | – |

FIG. 7

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). Also, the specifications of LTE-A (also referred to as "LTE-Advanced," "LTE Rel. 10 to 13," etc.) have been drafted for further broadbandization and increased speed beyond LTE (also referred to as "LTE Rel. 8 or 9"), and successor systems of LTE (also referred to as, for example, "FRA (Future Radio Access)," "5G (5th generation mobile communication system)," "NR (New RAT (Radio Access Technology)," "LTE Rel. 14 and later versions," etc.) are under study.

In existing LTE systems (for example, LTE Rel. 10 and later versions), carrier aggregation (CA) to integrate a number of carriers (component carriers (CCs), cells, and so forth) is introduced in order to achieve broadbandization. Each carrier is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Every cell group is comprised of at least 1 carrier (also referred to as "CC," "cell," etc.). In DC, a number of carriers of different radio base stations are integrated, so that DC is also referred to as "inter-eNB CA."

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," Apr., 2010

SUMMARY OF INVENTION

Technical Problem

In future radio communication systems (for example, 5G, NR, etc.), RATs (also referred to as "5G," "NR," "second RAT," etc.) that are different from existing radio access technologies (RATs) (also referred to as "LTE," "first RAT," etc.) will be adopted. Also, as for the mode of operation in future radio communication systems, stand-alone mode, which operates independently without coordinating with existing RAT, and non-stand-alone mode (NSA), which operates by coordinating with existing RAT, are anticipated.

In non-stand-alone radio communication systems (also referred to as "NR NSA" and the like), multiple carriers of different RATs (or a number of cell groups that are each comprised of multiple carriers (cells) of different RATs) are configured in a user terminal (also referred to as "UE (User Equipment)," "NR UE," etc.). Furthermore, envisaging non-stand-alone radio communication systems, research is underway to allow a user terminal to simultaneously connect with multiple carriers (also referred to as "multiple cell groups," "multiple cells," "multiple CCs," etc.) of different RATs (dual connectivity (DC)).

However, in non-stand-alone radio communication systems, even when an attempt is made to connect with a number of carriers of different RATs simultaneously and transmit multiple UL signals of different RATs using each of these multiple carriers, there is a high possibility that the plurality of UL signals cannot be transmitted properly.

The present invention has been made in view of the above, and it is therefore an object of the present invention to provide a user terminal and a radio communication method, whereby multiple UL signals of varying RATs can be transmitted properly in non-stand-alone radio communication systems.

Solution to Problem

In accordance with one aspect of the present invention, a user terminal has a transmission section that transmits a first uplink (UL) signal of a first radio access technology (RAT) and a second UL signal of a second RAT, at different times, and a control section that controls switching between a first time, which is used to transmit the first UL signal using a first UL carrier of the first RAT, and a second time, which is used to transmit the second UL signal using a second UL carrier of the second RAT.

Advantageous Effects of Invention

According to the present invention, a user terminal can properly transmit multiple UL signals of different RATs in non-stand-alone radio communication systems.

BRIEF DESCRIPTION OF DRAWINGS

FIG. 4 is a diagram to show examples of UL/DL configurations for use in TDD;

FIG. 5 is a diagram to show examples of timings for transmitting ACK/NACK in TDD;

FIG. 6 is a diagram to show examples of timings for scheduling PUSCH in TDD;

FIG. 7 is a diagram to show examples of timings for transmitting ACK/NACK in an FDD-SCell in TDD-FDD CA;

DESCRIPTION OF EMBODIMENTS

Figure 1:
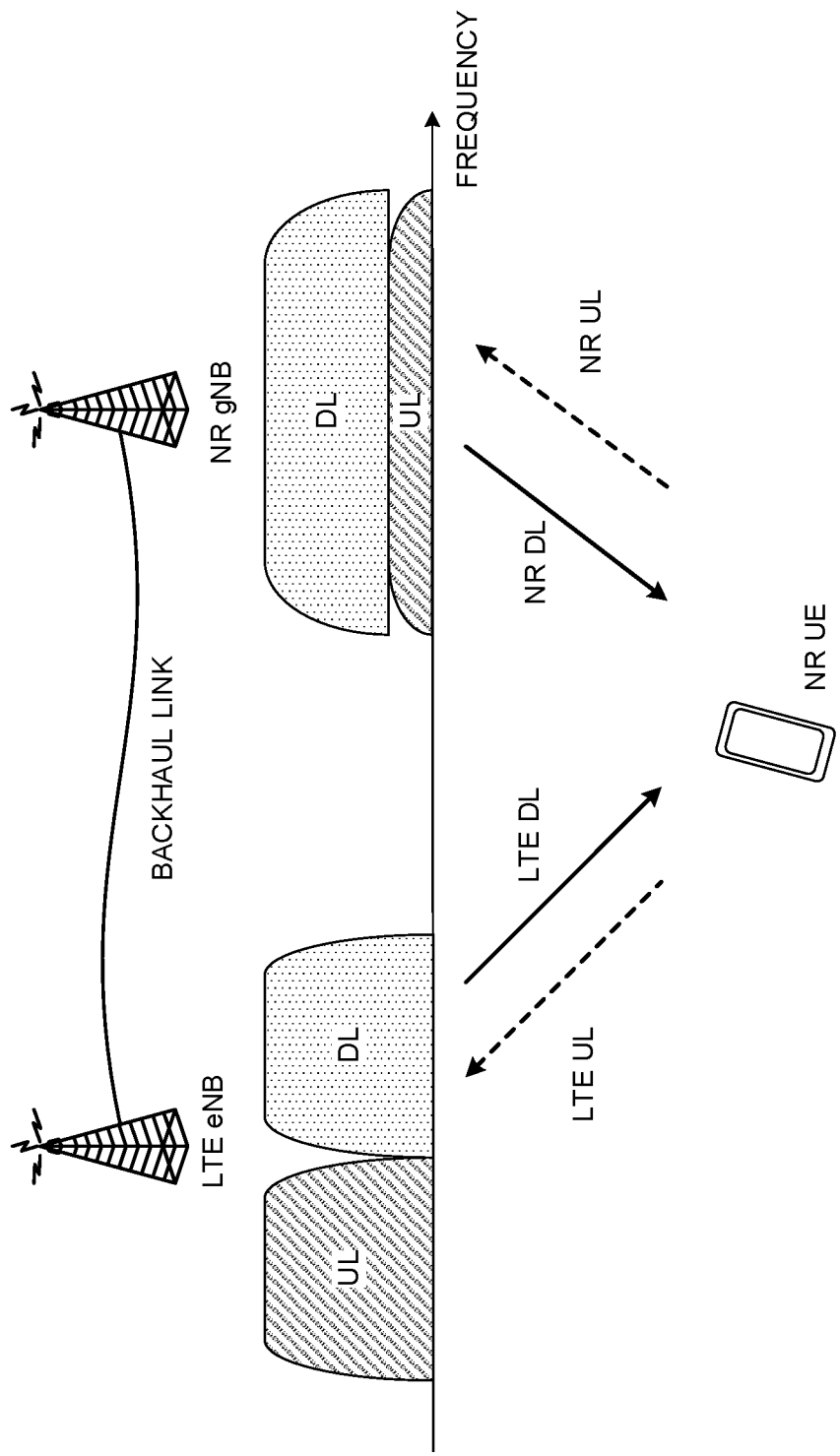
FIG. 1 is a diagram to show an example of a non-stand-alone radio communication system.

FIG. 1 is a diagram to show an example of a non-stand-alone radio communication system. As shown in FIG. 1, in non-stand-alone radio communication systems, one or more carriers for LTE (also referred to as "LTE carriers," "LTE cells," "first carriers," etc.) and one or more carriers for NR (also referred to as "NR carriers," "NR cells," "second carriers," etc.) are configured in a user terminal (NR UE).

These one or more LTE carriers (also referred to as a "cell group," "LTE cell group," "primary cell group (PCG)," etc.) may include one or more DL carriers (also referred to as "LTE DL carriers," "first DL carriers," etc.) and/or one or more UL carriers (also referred to as "LTE UL carriers," "first UL carriers," etc.).

In addition, these one or more NR carriers (also referred to as a "cell group," "NR cell group," "secondary cell group (SCG)," etc.) may include one or more DL carriers (also referred to as "NR DL carriers," "second DL carriers," etc.) and/or one or more UL carriers (also referred to as "NR UL carriers," "second UL carriers," etc.).

As shown in FIG. 1, one or more LTE carriers and one or more NR carriers are all allocated to different frequency bands. An LTE carrier may be allocated to a relatively low frequency band such as, for example, at least one of 800 MHz, 1.7 GHz and 2.1 GHz. Also, an NR carrier may be allocated to a relatively high frequency band such as, for example, 3 GHz or higher.

For example, in FIG. 1, frequency division duplexing (FDD) is applied to LTE, so that the LTE UL carrier and the LTE DL carrier are provided at different frequencies. Also, given that time division duplexing (TDD) is applied to NR, the NR UL carrier and the NR DL carrier may be provided at the same frequency. Note that FIG. 1 is simply an example, and it is equally possible to apply TDD to LTE, and apply FDD to NR. Also, although cases are shown here in which 1 LTE carrier and 1 NR carrier are present, but 2 or more LTE carriers and NR carriers may be present as well.

Furthermore, in FIG. 1, the radio base station of LTE (also referred to as "eNodeB (eNB)," "LTE eNB," "LTE base station," etc.) and the radio base station of NR (also referred to as "gNodeB (gNB)," "NR gNB," "NR base station," etc.) are connected via a backhaul link (for example, a wired link such as the X2 interface or a wireless link). Note that the LTE base station and the NR base station may be installed at the same location, or may be installed at different locations that are geographically apart.

Now, for the non-stand-alone radio communication system shown in FIG. 1, studies are in progress to allow a user terminal to connect with the LTE DL carrier and the NR DL carrier simultaneously (this is also referred to as "LTE-NR dual connectivity," etc.).

To be more specific, referring still to FIG. 1, studies are underway to allow a user terminal to receive, simultaneously, DL signals of LTE (also referred to as "LTE DL signals," "first DL signals," etc.) and DL signals of NR (also referred to as "NR DL signals," "second DL signals," etc.) by using both the LTE DL carrier and the NR DL carrier. In addition, studies are underway to allow a user terminal to transmit, simultaneously, UL signals of LTE (also referred to as "LTE UL signals," "first UL signals," etc.) and UL signals of NR (also referred to as "NR UL signals," "second UL signals," etc.) by using both the LTE UL carrier and the NR UL carrier.

However, when the LTE UL carrier and the NR UL carrier run dual connectivity, there is a possibility that an LTE UL signal and an NR UL signal cannot be transmitted properly by using the LTE UL carrier and the NR UL carrier separately.

For example, the coverage of a high frequency band is smaller than the coverage of a low frequency band. It then follows that, when an LTE UL signal and an NR UL signal are transmitted simultaneously by using the LTE UL carrier, which uses a low frequency band, and the NR UL carrier, which uses a high frequency band, the coverage of the NR UL signal, which is smaller than the coverage of the LTE UL signal, poses a problem.

Also, when an LTE UL signal and an NR UL signal are transmitted simultaneously by using the LTE UL carrier of a low frequency band (for example, 1.7 GHz) and the NR UL carrier of a high frequency band (for example, 3.5 GHz) separately, there is a possibility that the performance of DL will decline due to inter-modulation that takes place in user terminals.

So, presuming a non-stand-alone radio communication system, in which a user terminal transmits UL signals of a plurality of different RATs by using, respectively, UL carriers corresponding to these RATs, the present inventors have come up with the idea of allowing a user terminal to transmit only a single UL signal, by using a single UL carrier, at a certain time.

Now, embodiments of the present invention will be described below in detail with reference to the accompanying drawings. Note that, although the following embodiments will assume that one or more LTE carriers and one or more NR carriers are configured for a user terminal, multiple carriers according to the present embodiment are by no means limited to LTE carriers and NR carriers, as long as they only are multiple carriers of varying RATs.

First Example

According to a first example of the present invention, a user terminal is allowed to connect with DL carriers of a number of RATs simultaneously, while the UL carrier where UL signals can be transmitted is switched over time among these UL carriers of multiple RATs.

According to the first example, a user terminal can receive DL signals of a number of RATs, simultaneously, by using DL carriers of these RATs, respectively. Meanwhile, the user terminal transmits UL signals of a number of RATs, at different times, by using UL carriers of these RATs, respectively.

Figure 2:
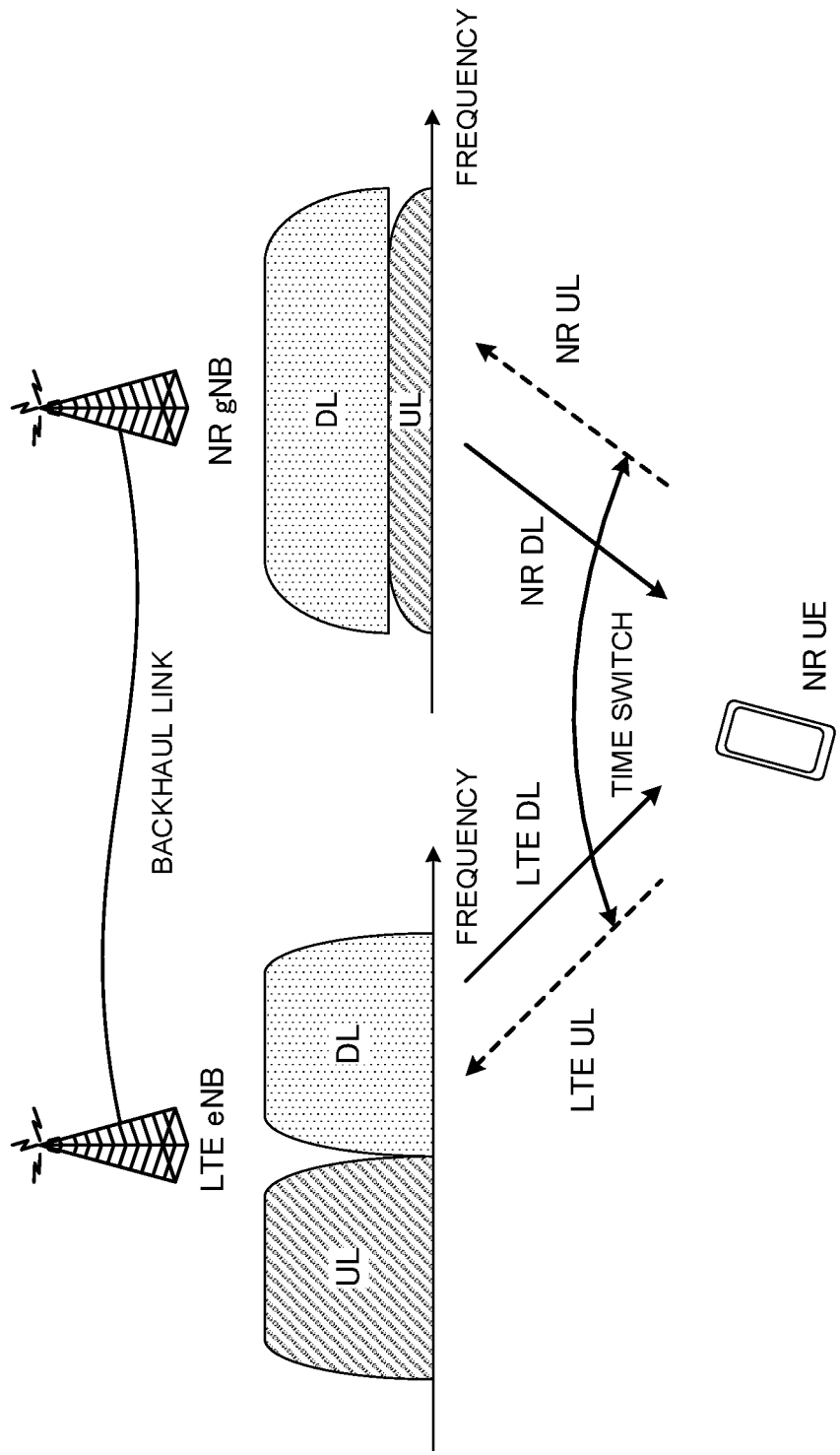
FIG. 2 is a diagram to show an example of a non-stand-alone radio communication system according to a first example of the present invention.

FIG. 2 is a diagram to show an example of a non-stand-alone radio communication system according to a first example of the present invention. As has been described with reference to FIG. 1, FIG. 2 also shows a case in which FDD is used in LTE and TDD is used in NR, but this is simply an example, and is by no means limiting. Now, differences from FIG. 1 will be primarily described below.

In FIG. 2, the LTE base station and the NR base station both have MAC (Medium Access Control) entities. A MAC entity refers to a processing entity that performs MAC layer processing. MAC layer processing includes, for example, at least one of multiplexing of logical channels, retransmission control (HARQ (Hybrid Automatic Repeat reQuest)), scheduling, multiplexing of data across multiple carriers (CCs) and demultiplexing of the data.

Referring to FIG. 2, a user terminal (NR UE) connects with an LTE DL carrier and an NR DL carrier simultaneously (dual connectivity). Here, the user terminal can receive LTE DL signals and NR DL signals from the LTE base station and the NR base station, simultaneously, by using both the LTE DL carrier and the NR DL carrier.

Meanwhile, the user terminal switches between transmission of LTE UL signals using the LTE UL carrier and transmission of NR UL signals using the NR UL carrier, over time. That is, the user terminal transmits LTE UL signals and NR UL signals at different times, by using the LTE UL carrier and the NR UL carrier, respectively.

In this way, in the non-stand-alone radio communication system shown in FIG. 2, the transmission and/or receipt (transmission/receipt) of LTE DL signals and LTE UL signals are confined within the LTE carrier, and the transmission/receipt of NR DL signals and NR UL signals are confined within the NR carrier.

For example, the LTE UL signal illustrated in FIG. 2 may be at least one of the PUCCH (Physical Uplink Control CHannel), the PUSCH (Physical Uplink Shared CHannel), the PRACH (Physical Random Access CHannel), UL data and uplink control information (UCI). Likewise, the NR UL signal illustrated may be, for example, at least one of an NR UL control channel (also referred to as "NR-PUCCH," etc.), a UL data channel (also referred to as a "UL shared channel," "NR-PUSCH," etc.), a random access channel, UL data and UCI.

The LTE DL signal illustrated in FIG. 2 may be, for example, at least one of PDCCH (Physical Downlink Control CHannel), EPDCCH (Enhanced PDCCH), PDSCH (Physical Downlink Shared CHannel), downlink control information (DCI) and DL data. Likewise, the NR DL signal illustrated may be, for example, at least one of an NR DL control channel (also referred to as "NR-PDCCH," etc.), a DL data channel (also referred to as a "DL shared channel," "NR-PDSCH," etc.), DCI, and DL data.

Figure 3:
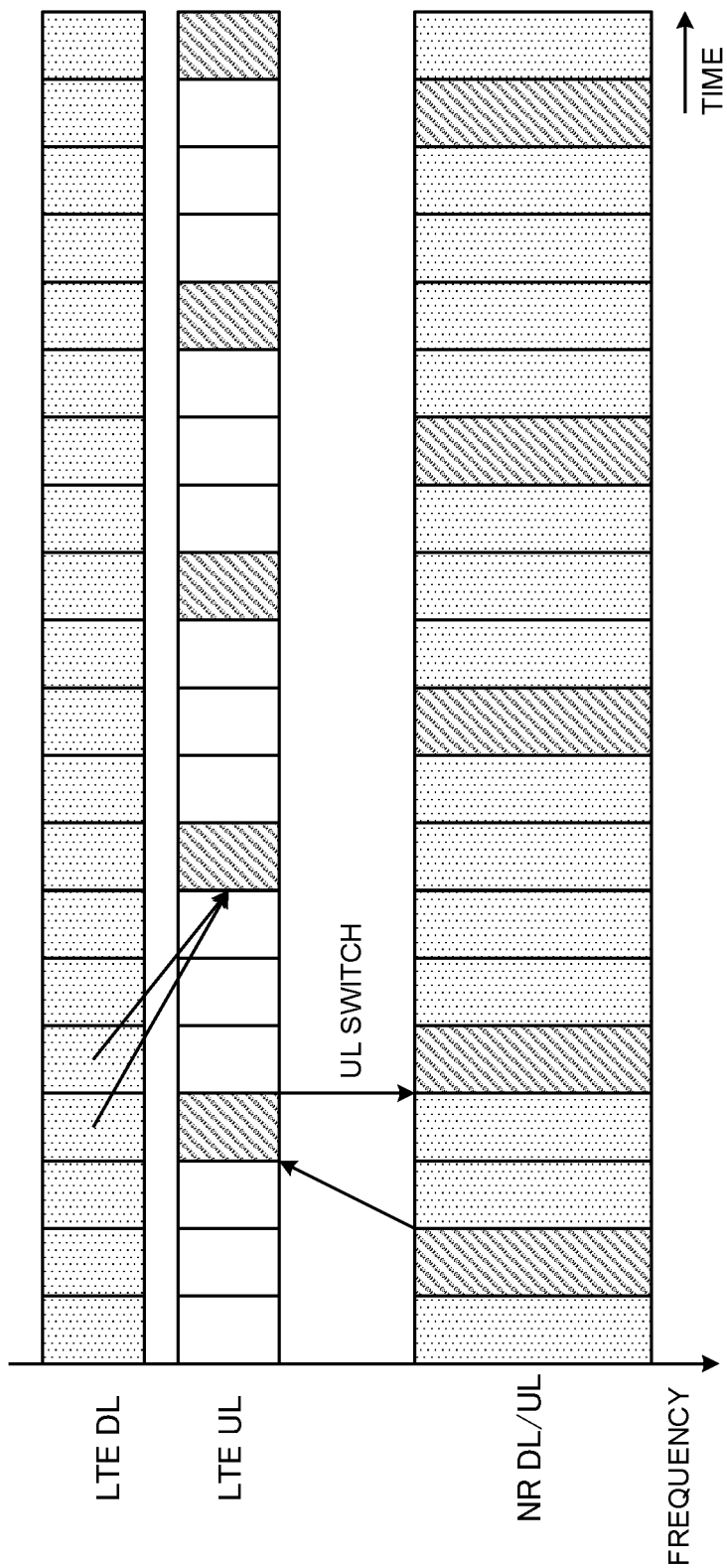
FIG. 3 is a diagram to show an example of switching between an LTE UL carrier and an NR UL carrier according to the first example.

FIG. 3 is a diagram to show an example of switching between an LTE UL carrier and an NR UL carrier according to the first example. Similar to FIG. 2, with FIG. 3, an example case will be described in which FDD is used in LTE and TDD is used in NR. Referring to FIG. 3, the time for transmitting LTE UL signals in the LTE UL carrier (also referred to as the "first time" and the like) and the time for transmitting NR UL signals in the NR UL carrier (also referred to as the "second time" and the like) may be switched based on predetermined rules.

When FDD is used in existing LTE systems (for example, LTE Rel. 13 and earlier versions), the user terminal transmits delivery acknowledgement information (also referred to as an "A/N," an "HARQ-ACK," an "HARQ-ACK bit," "A/N codebook," etc.) in response to a PDSCH in subframe #n+k, which is located k (k=4) milliseconds (ms) after subframe #n in which the PDSCH is received. Also, the user terminal transmits a PUSCH in subframe #n+k, which is located k (k=4) milliseconds (ms) after subframe #n in which DCI (UL grant) is received.

On the other hand, in the non-stand-alone radio communication system shown in FIG. 2, even if FDD is used in LTE, as shown in FIG. 3, the time (for example, subframes or TTIs) LTE UL signals can be transmitted using the LTE UL carrier is limited. For example, in FIG. 3, TTIs which can transmit LTE UL signals are provided in a predetermined cycle (here, every 4 TTIs), and the transmission of LTE UL signals is suspended in the rest of the TTIs.

<Transmission Time of LTE UL Signals>

The time LTE UL signals can be transmitted (also referred to as the "first time," "the timing for transmitting LTE UL signals," etc.) may be determined based on predetermined rules. For example, the time LTE UL signals can be transmitted may be determined based on UL/DL configurations (UL-DL configurations) for use in TDD of existing LTE systems (for example, LTE Rel. 13 and earlier versions). UL/DL configurations show the configurations (ratios) of UL subframes and DL subframes in radio frames.

FIG. 4 is a diagram to show examples of UL/DL configurations for use in TDD. For example, FIG. 4 shows 7 UL/DL configurations 0 to 6, which show the configurations of UL subframes and DL subframes. Note that the UL/DL configurations shown in FIG. 4 are simply examples and are by no means limiting, and new UL/DL configurations for FDD may be provided. Also, referring to FIG. 4, a special subframe refers to a subframe for switching between a DL subframe and a UL subframe, and may be used primarily in DL communication.

When FDD is used in LTE, as shown in FIG. 2, the time LTE UL signals can be transmitted on the LTE UL carrier may be the same as the timing of UL subframes in any UL/DL configuration. Even when FDD is used in LTE, the indices of UL/DL configurations for use in TDD may be reported to a user terminal as information that indicates the timing for transmitting LTE UL signals in the LTE UL carrier.

<Timing for Transmitting ACK/NACK in Response to LTE DL Signal>

When the timing for transmitting LTE UL signals on the LTE UL carrier for FDD is indicated by UL/DL configurations in TDD, the timing for transmitting ACK/NACK in response to LTE DL signals received on the LTE DL carrier for FDD may be determined based on the timing for transmitting ACK/NACK in TDD.

FIG. 5 is a diagram to show examples of timings for transmitting ACK/NACK in TDD. For example, in FIG. 5, the value of k when ACK/ANCK in response to the LTE DL signal of subframe #n-k is transmitted in subframe #n is shown for every UL/DL configuration (see FIG. 4). The timing for transmitting ACK/NACK in response to LTE DL signals received in the LTE DL carrier for FDD may be indicated using this value of k.

<Timing for Scheduling LTE UL Signals>

When the timing for transmitting LTE UL signals in the LTE UL carrier for FDD is indicated by UL/DL configurations in TDD, the timing for scheduling LTE UL signals in the LTE UL carrier for FDD may be determined based on the timing for scheduling PUSCH in TDD.

FIG. 6 is a diagram to show examples of timings for scheduling PUSCH in TDD. For example, in FIG. 6, the value of k when the LTE UL signal of subframe #n+k is scheduled in subframe #n is shown for every UL/DL configuration (see FIG. 4). The timing for scheduling LTE UL signals to transmit on the LTE UL carrier for FDD may be indicated using this value of k.

<DCI>

When the timing for transmitting LTE UL signals in the LTE UL carrier for FDD is indicated by UL/DL configurations, even if DCI (also referred to as "DL assignment," "DCI format 1/1A/1B/1D/2/2A to 2D," etc.) is used to schedule FDD LTE DL signals, the number of bits to constitute the HARQ process number (HPN) field in this DCI (for example, 4 bits, which is the same as when TDD is used) may be greater than when FDD is used (for example, 3 bits). The HPN field indicates the HPN, which is used to control the retransmission of LTE DL signals and/or LTE UL signals.

Also, when the timing for transmitting LTE UL signals in the LTE UL carrier for FDD is indicated by UL/DL configurations, the DCI that is used to schedule LTE DL signals and/or LTE UL signals in FDD may include a DAI (Downlink Assignment Index).

(Variations)

Alternatively, when a TDD carrier and an FDD carrier run CA, and the primary cell (PCell) employs TDD while a secondary cell (SCell) employs FDD (TDD-FDD CA with TDD-PCell), the timing for transmitting ACK/NACK in response to LTE DL signals received on the FDD LTE DL carrier may be determined based on the timing for transmitting ACK/NACK in response to LTE DL signals received in the secondary cell.

FIG. 7 is a diagram to show examples of timings for transmitting ACK/NACK in an FDD-SCell in TDD-FDD CA. For example, in FIG. 7, the value of k when ACK/NACK in response to the LTE DL signal of subframe #n-k is transmitted in subframe #n is shown for every UL/DL configuration. The timing for transmitting ACK/NACK in response to LTE DL signals received in the LTE DL carrier for FDD may be indicated using this value of k.

Given the timings for transmitting ACK/NACK in TDD shown in FIG. 5, there is no prospect of receiving LTE DL signal at timings LTE UL signals are transmitted. Meanwhile, as shown in FIG. 3 in FDD, LTE DL signals can be received at timings LTE UL signals are transmitted. By using the timings for transmitting ACK/NACK for FDD-SCell in TDD-FDD CA shown in FIG. 7, the LTE base station can transmit LTE DL signals even at the LTE UL signal transmitting timings shown in FIG. 3.

<Timing for Transmitting NR UL Signal>

The time NR UL signals can be transmitted (LTE NR signal transmission timings) has only to be different from the timings for transmitting LTE UL signals. That is, the time when NR UL signals can be transmitted may be determined based on UL subframes of the above-described UL/DL configurations.

For example, when an NR UL signal is scheduled (allocated to a user terminal) at a timing at which an LTE UL signal is transmitted, the user terminal may prioritize transmitting the LTE UL signal. However, when no LTE UL signal is scheduled (or transmitted) at a timing for transmitting an LTE UL signal, the user terminal may transmit an NR UL signal at this timing for transmitting the LTE UL signal.

According to the first example, the UL carrier to transmit UL signals is switched over time among UL carriers of a number of RATs, so that multiple UL signals of varying RATs can be transmitted properly. In particular, by implementing dual connectivity while cancelling the impact of inter-modulation, downlink signals can be received from an LTE carrier and from an NR carrier, simultaneously.

According to this first example, the NR base station needs to know the timing for transmitting ACK/NACK and the timing for allocating PUSCH, so that information about the timing of UL transmission described in the first example may be communicated from the LTE radio base station to the NR radio base station, via the X2 interface and the like.

Second Example

According to a second example of the present invention, connection with only a single RAT's carrier is permitted at a given time, and the carrier that can be used is switched over time among a number of RATs.

According to the second example, the time to switch between carriers (DL carrier and/or UL carrier) of multiple RATs may be configured semi-statically in a user terminal.

Figure 8:
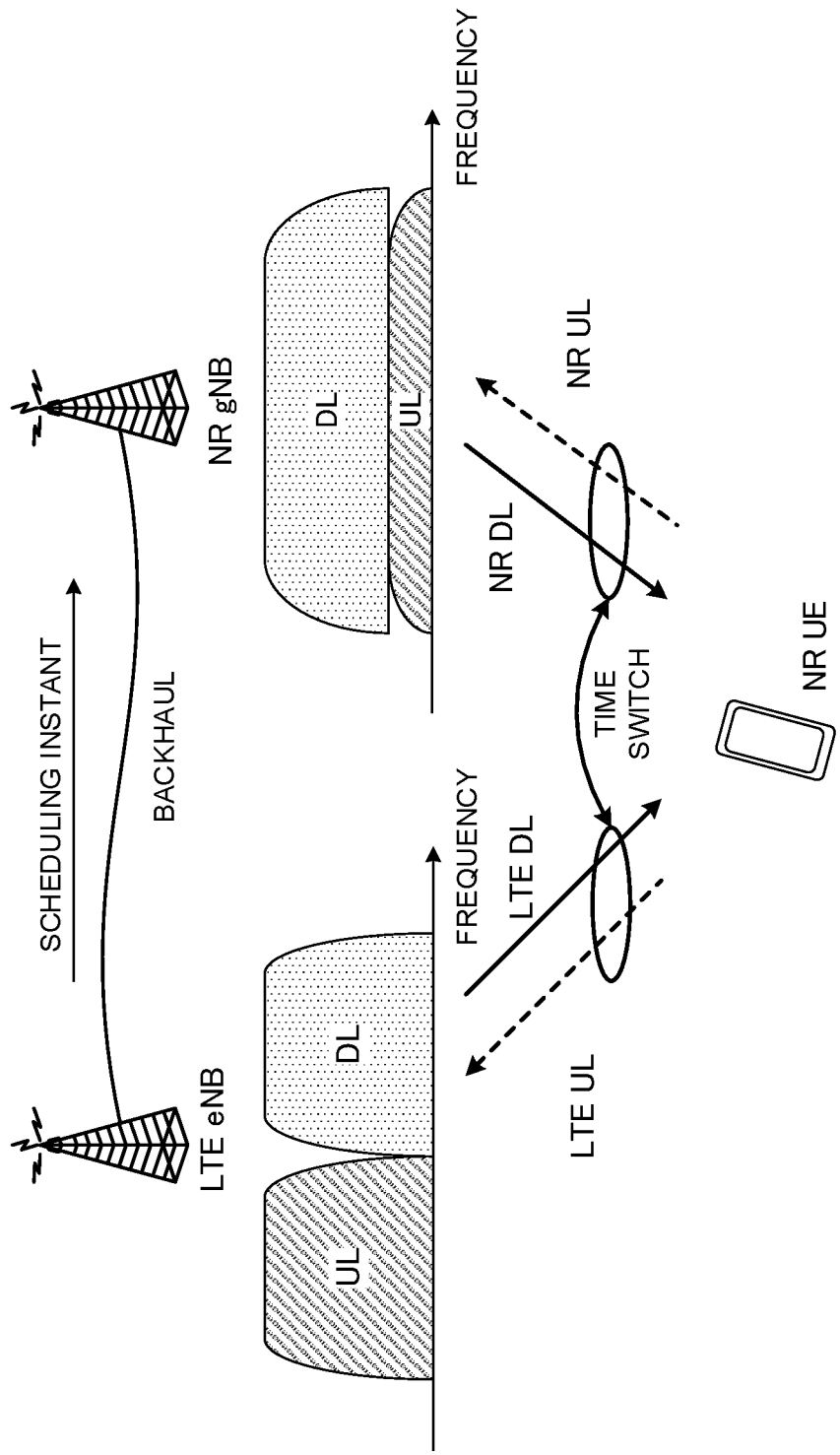
FIG. 8 is a diagram to show an example of a non-stand-alone radio communication system according to a second example of the present invention.

FIG. 8 is a diagram to show an example of a non-stand-alone radio communication system according to the second example. As has been described earlier with reference to FIG. 1, FIG. 8 also shows a case in which FDD is applied to LTE and TDD is applied to NR, but this is simply an example and by no means limiting. Now, differences from FIGS. 1 and 2 will be primarily described below.

The user terminal switches between an LTE carrier and an NR carrier over time. To be more specific, the user terminal transmits LTE UL signals and/or receives LTE DL signals at times when the LTE carrier can be used. Also, the user terminal transmits NR UL signals and/or receives NR DL signals at times when the NR carrier can be used.

The time to switch between the LTE carrier (LTE DL carrier and/or LTE UL carrier) and the NR carrier (NR DL carrier and/or NR UL carrier) may be configured in advance in the user terminal. To be more specific, the user terminal may receive information to indicate this switching time via higher layer signaling (for example, RRC signaling).

In this way, in the non-stand-alone radio communication system shown in FIG. 8, the transmission and/or receipt (transmission/receipt) of LTE DL signals and LTE UL signals are confined within the LTE carrier and within the time for the LTE carrier, and the transmission/receipt of NR DL signals and NR UL signals are confined within the NR carrier and within time for the NR carrier.

Figure 9:
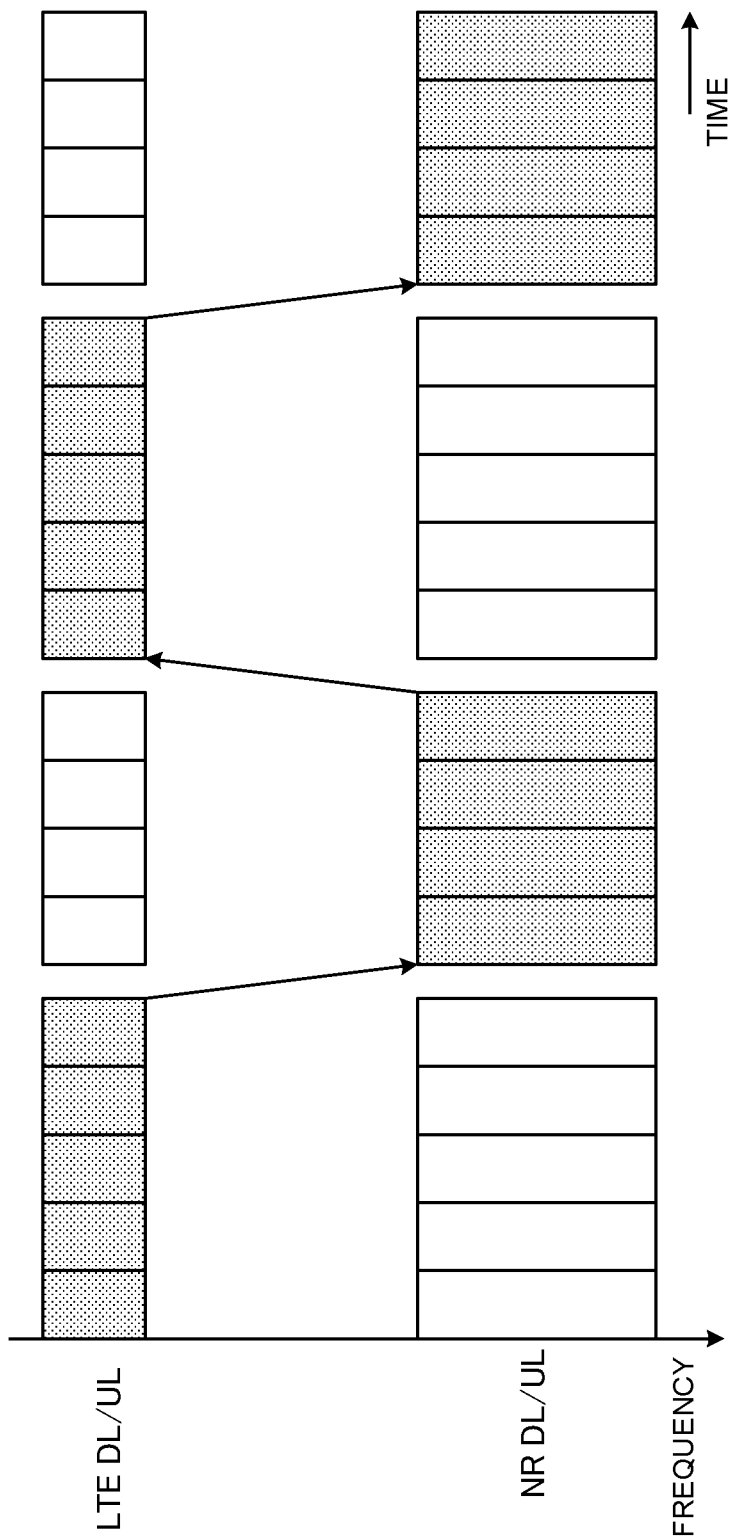
FIG. 9 is a diagram to show an example of switching between an LTE carrier and an NR carrier according to the second example.

FIG. 9 is a diagram to show an example of switching between an LTE carrier and an NR carrier according to the second example. As shown in FIG. 9, the LTE carrier and the NR carrier may be switched over time based on predetermined rules.

As shown in FIG. 9, when the time for the LTE carrier and the time for the NR carrier are switched based on predetermined rules, resources (for example, frequency resources) may be split between the LTE carrier and the NR carrier.

Furthermore, the user terminal may monitor LTE DL signals (for example, LTE control plane signals), periodically, regardless of the time for the NR carrier, the time for the LTE carrier and so on.

According to the second example, multiple RATs are switched over time, so that multiple UL signals of varying RATs can be transmitted properly. In particular, the impact of inter-modulation can be cancelled. According to the second example, the NR base station needs to know the time for the NR carrier. Therefore, the time for the NR carrier may be communicated from the LTE base station to the NR base station via the X2 interface or the like.

Other Examples

In the first and/or second examples, the granularity of ACK/NACK in response to NR DL signals may correspond to transport blocks (TBs), or correspond to code block groups (CBG) that are comprised of one or more code blocks (CB).

Also, in the first and/or second examples, the user terminal may switch between the transmission of LTE UL signals (for example, the PRACH) and the transmission of NR UL signals (for example, the UL signal for random access for NR) over time.

Furthermore, according to the first and/or second examples, the LTE base station transmits at least one of UCI for NR and/or control information related to UL data (NR control information), to the NR base station, via an interface for between radio base stations of different RATs (for example, the X2 interface).

This NR control information may include, for example, at least one of information to show the number of A/N bits for NR, information to show the number of carriers (cells) in NR, information to show the number of CBGs, information to show numerologies for NR (for example, at least one of subcarrier spacing, the length of symbols and the length of cyclic prefixes), and information to show the timing at which the NR base station can schedule DL data. For example, the NR control information may be transmitted by using X2 signaling.

Also, in the first and/or second example, the user terminal may configure (set) MAC entities per carrier (also referred to as "frequency," "CC," "cell group," etc.).

(Radio Communication System)

Now, the structure of a radio communication system according to the present embodiment will be described below. In this radio communication system, each radio communication method according to the above-described embodiments is employed. Note that the radio communication methods according to the herein-contained examples of the present invention may be applied individually, or may be combined and applied.

Figure 10:
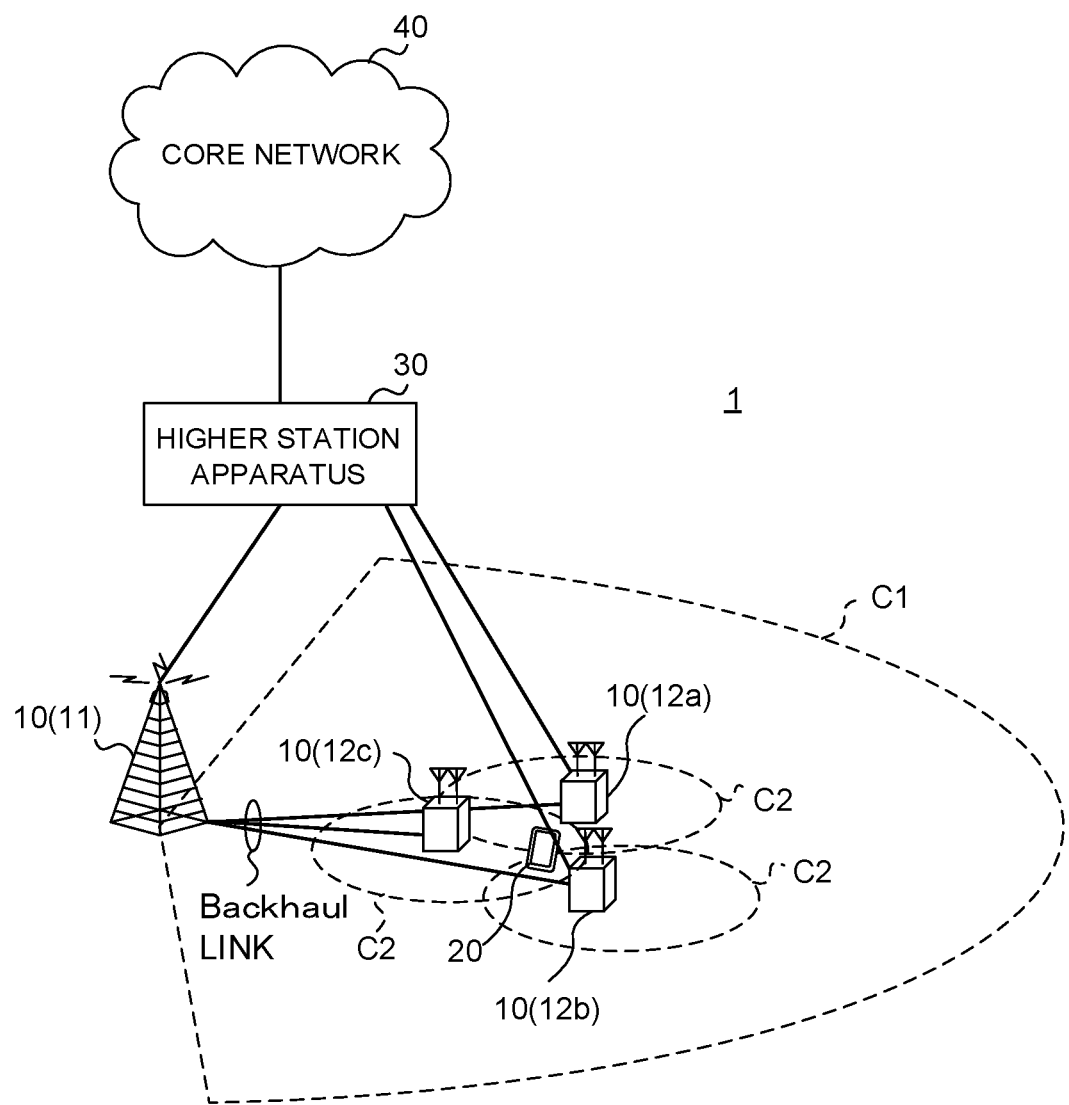
FIG. 10 is a diagram to show an exemplary schematic structure of a radio communication system according to the present embodiment.

FIG. 10 is a diagram to show an exemplary schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit. Note that the radio communication system 1 may be a non-stand-alone type (NR NSA), in which an existing RAT (for example, SUPER 3G, LTE-A (LTE-Advanced), IMT-Advanced or 4G)) and a new RAT (for example, 5G, FRA (Future Radio Access) or NR (New RAT)) run together.

The radio communication system 1 shown in FIG. 10 includes a radio base station 11 that forms a macro cell C1, and radio base stations 12a to 12c that are allocated within the macro cell C1 and that form small cells C2, which are narrower than the macro cell C1. Also, user terminals 20 are placed in the macro cell C1 and in each small cell C2. A structure in which different RAT and/or numerologies are used between cells may be adopted. Note that numerologies may be RAT-specific communication parameters (for example, at least one of subcarrier spacing, the length of symbols, the length of CPs, the length of TTIs, etc.).

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can run CA or DC by using a plurality of cells (CCs) (for example, 2 or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), one or both of a TTI having a relatively long time length (for example, 1 ms) (also referred to as a "subframe," a "normal TTI," a "long TTI," a "normal subframe," a "long subframe" a "slot," etc.) and a TTI having a relatively short time length (also referred to as a "short TTI," a "short subframe," a "slot," a "subslot" a "minislot," etc.) may be used. Also, in each cell, TTIs of different time lengths may co-exist.

Between the user terminals 20 and the radio base station 11, communication can be carried out using a carrier (referred to as, for example, an "existing carrier," a "legacy carrier" and so on) of a relatively low frequency band (for example, 2 GHz). Meanwhile, carriers of higher frequency bands than existing carriers (for example, 3.5 GHz, 5 GHz, 30 to 70 GHz, etc.), or carriers of the same frequency band as existing carriers may be used between the user terminal 20 and the radio base station 12. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on.

Also, the LTE base stations (LTE eNBs) shown in FIGS. 1, 2 and 8 may be radio base stations 11 and/or radio base stations 12. Also, the NR base station (NR gNB) may be a radio base station 11 and/or a radio base station 12. Hereinafter the radio base stations 11 and 12 will be collectively referred to as "radio base stations 10," unless specified otherwise.

Each user terminal 20 is a terminal that supports one or more RATs such as at least one of LTE, LTE-A, NR, and 5G, and may be not limited to a mobile communication terminal, and may be a stationary communication terminal.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL data channel (PDSCH (Physical Downlink Shared CHannel), also referred to as a DL shared channel and/or the like), which is used by each user terminal 20 on a shared basis, a broadcast channel (PBCH (Physical Broadcast CHannel)), L1/L2 control channels and so on are used as DL channels. At least one of user data, higher layer control information, SIBs (System Information Blocks) and so forth is communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), NR-PDCCH, etc., PCFICH (Physical Control Format Indicator CHannel), PHICH (Physical Hybrid-ARQ Indicator CHannel)) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (also referred to as "A/N," "HARQ-ACK," "HARQ-ACK bit," "A/N codebook" and so on) can be communicated by using at least one of the PHICH, the PDCCH and the EPDCCH.

In the radio communication system 1, a UL data channel (also referred to as a "PUSCH (Physical Uplink Shared CHannel)," a "UL shared channel," "NR-PUSCH," and/or the like), which is used by each user terminal 20 on a shared basis, a UL control channel (PUCCH (Physical Uplink Control CHannel), NR-PUCCH, etc.), a random access channel (PRACH (Physical Random Access CHannel)) and so on are used as UL channels. User data, higher layer control information and so on are communicated by the PUSCH. Uplink control information (UCI), including at least one of PDSCH delivery acknowledgement information (A/N, HARQ-ACK, etc.), channel state information (CSI), a scheduling request (SR) and so on is communicated in the PUSCH or the PUCCH. By means of the PRACH, random access preambles for establishing connections with cells are communicated.

<Radio Base Station>

Figure 11:
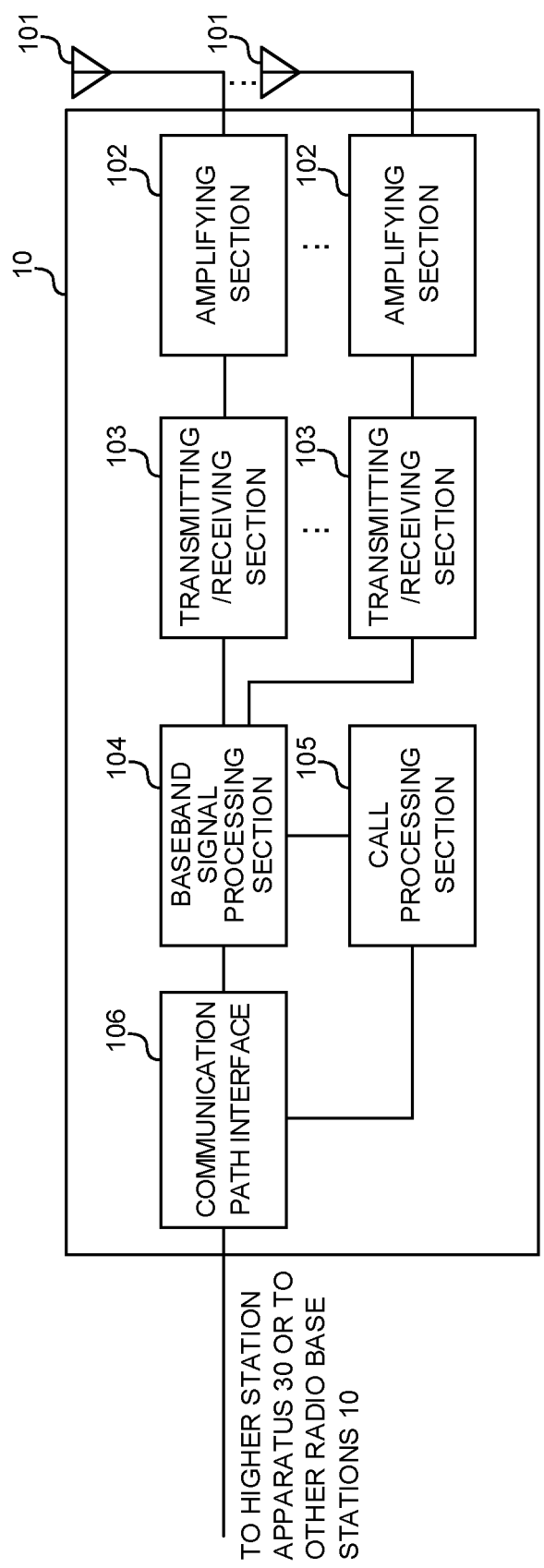
FIG. 11 is a diagram to show an exemplary overall structure of a radio base station according to the present embodiment.

FIG. 11 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 may be either an LTE base station or an NR base station.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving sections 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via a backhaul link (for example, an interface in compliance with the CPRI (Common Public Radio Interface), such as optical fiber, the X2 interface, etc.). In the present embodiment, the communication path interface 106 can constitute a transmission section and/or a receiving section that transmits and/or receives signals between other radio base stations 10.

Also, the transmitting/receiving sections 103 transmit DL signals (for example, at least one of DCI (DL assignment to schedule DL data, and/or UL grant to schedule UL data), DL data and DL reference signal) by using an LTE DL carrier and/or an NR DL carrier. Also, the transmitting/receiving sections 103 receive multiple UL signals (for example, at least one of UL data, UCI and UL reference signals) of different RATs, at different times, by using each of an LTE UL carrier and an NR UL carrier.

The DL signals may include LTE DL signals and/or NR DL signals. The UL signals may include LTE UL signals and/or NR UL signals.

Also, the transmitting/receiving sections 103 receive delivery acknowledgement information (also referred to as "ACK/NACK," "A/N," "HARQ-ACK," "A/N codebook," etc.) in response to DL signals (LTE DL signals and/or NR DL signals). As to how often this delivery acknowledgement information is transmitted, for example, the delivery acknowledgement information may be transmitted per CBG, per TB or for every one or more TBs (that is, ACK or NACK may be indicated per CBG, per TB or for every one or more TBs). In addition, the transmitting/receiving sections 103 may transmit configuration information for the unit for retransmission of DL signals and/or UL signals.

Also, the communication path interface 106 of the LTE base station may transmit, a MAC signal, which carries UCI/UL data for NR, received on the LTE UL carrier, to the NR base station, via a backhaul link. Also, the communication path interface 106 of the LTE base station may transmit NR control information to the NR base station, via a backhaul link (for example, the X2 interface). The communication path interface 106 of the NR base station may receive MAC signals and/or NR control information, from the LTE base station, via a backhaul link.

Figure 12:
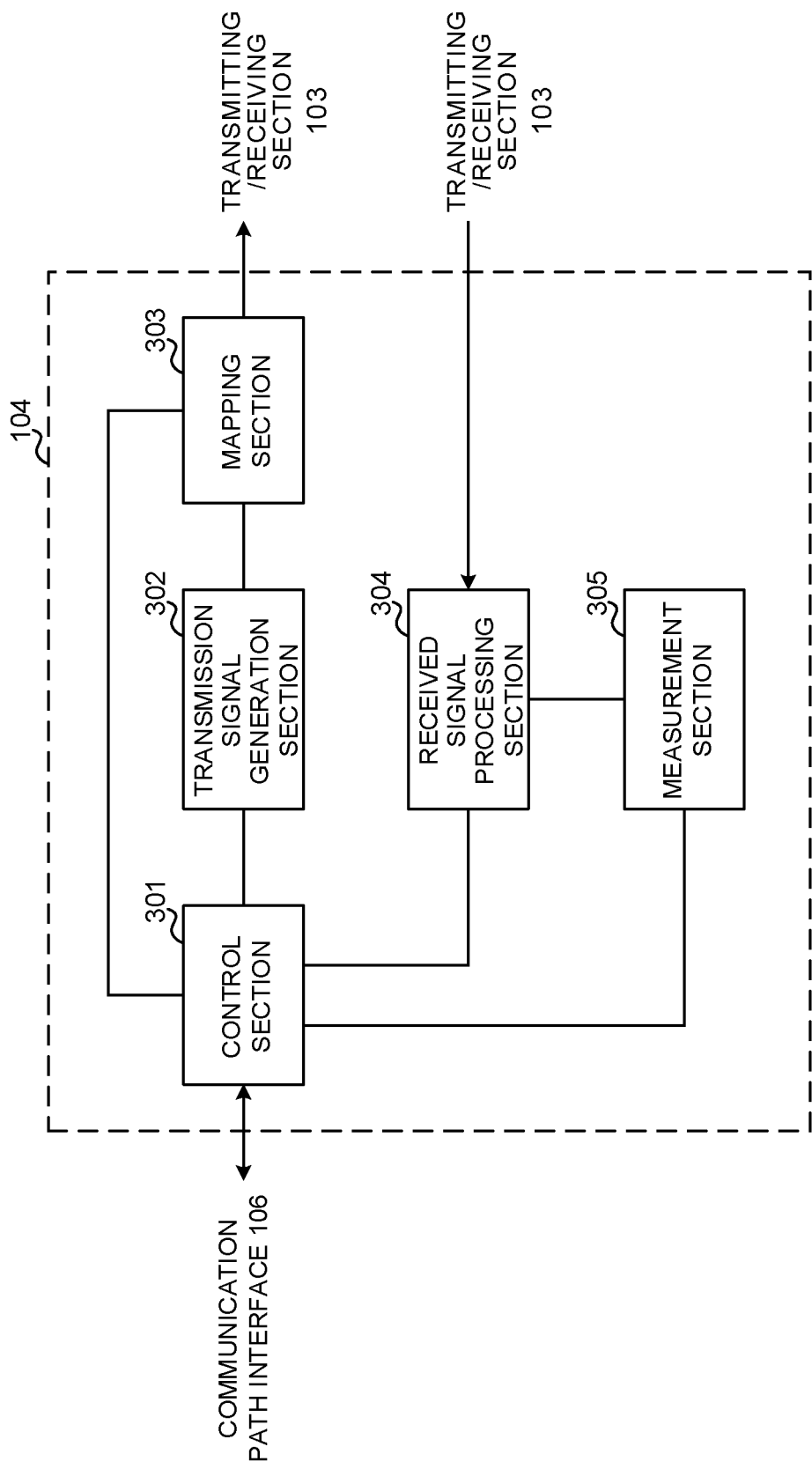
FIG. 12 is a diagram to show an exemplary functional structure of a radio base station according to the present embodiment.

FIG. 12 is a diagram to show an exemplary functional structure of a radio base station according to the present embodiment. Note that, although FIG. 12 primarily shows functional blocks that pertain to characteristic parts of the present embodiment, the radio base station 10 may have other functional blocks that are necessary for radio communication as well. As shown in FIG. 12, the baseband signal processing section 104 has a control section 301, a transmission signal generation section 302, a mapping section 303, a received signal processing section 304 and a measurement section 305. Each MAC entity of the present embodiment may be constituted by at least one of a control section 301, a transmission signal generation section 302, and a received signal processing section 304.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305.

To be more specific, the control section 301 controls the scheduling and/or transmission processes (for example, modulation, coding, transport block size (TBS), etc.) for DL signals based on UCI transmitted as feedback from the user terminal 20. Also, when the TBS exceeds a predetermined threshold, the control section 301 may apply code block segmentation to DL signals, whereby a TBS is divided into multiple CBs.

The control section 301 also controls the scheduling of UL signals based on UCI transmitted as feedback from the user terminal 20. The control section 301 also controls receiving process (for example, at least one of demodulation, decoding, and carrier demultiplexing) for the UL signals. For example, the control section 301 controls receiving processes for LTE UL signals and NR UL signals by using the LTE UL carrier and an NR UL carrier, respectively.

The control section 301 also controls switching between the time to receive LTE UL signals and/or transmit LTE DL signals using the LTE carrier, and the time to receive NR UL signals and/or transmit NR DL signals using the NR carrier.

To be more specific, the control section 301 may control simultaneous connection with an LTE DL carrier, which is used to transmit LTE DL signals, and an NR DL carrier, which is used to transmit NR DL signals (see the first example and FIG. 3). The control section 301 may also control switching between the time to receive LTE UL signals using the LTE UL carrier and the time to receive NR UL signal using the NR UL carrier (see the first example and FIG. 3).

Also, when the LTE UL carrier and the LTE DL carrier are subject to frequency division duplexing (FDD), the control section 301 may determine at least one of the time to receive LTE UL signals, the timing for receiving delivery acknowledgement information in response to LTE DL signals, and the timing for scheduling LTE UL signals based on UL/DL configurations for use in time division duplexing (TDD) (see the first example and FIGS. 3 to 7).

Also, when the LTE UL carrier and the LTE DL carrier are subject to frequency division duplexing (FDD), the control section 301 may determine the time to receive NR UL signals, based on UL/DL configurations (see the first example and FIG. 3).

Also, the control section 301 may control a single connection with an LTE DL carrier, which is used to transmit LTE DL signals, or with an NR DL carrier, which used to transmit NR DL signals, within a certain time (see the second example and FIG. 9).

The control section 301 can be constituted by a controller, a control circuit or control apparatus that can be described based on general understanding of the technical field to which the present invention pertains.

The transmission signal generation section 302 may generate a DL signal (including at least one of DL data, DCI, a DL reference signal and control information that is provided by way of higher layer signaling) based on commands from the control section 301, and output this signal to the mapping section 303.

The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, at least one of demapping, demodulation, decoding, carrier demultiplexing, etc.) for UL signals transmitted from the user terminal 20. To be more specific, the received signal processing section 304 may output the received signals, the signals after the receiving processes and so on, to the measurement section 305. In addition, the received signal processing section 304 performs UCI receiving processes based on UL control channel configuration commanded from the control section 301.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 13:
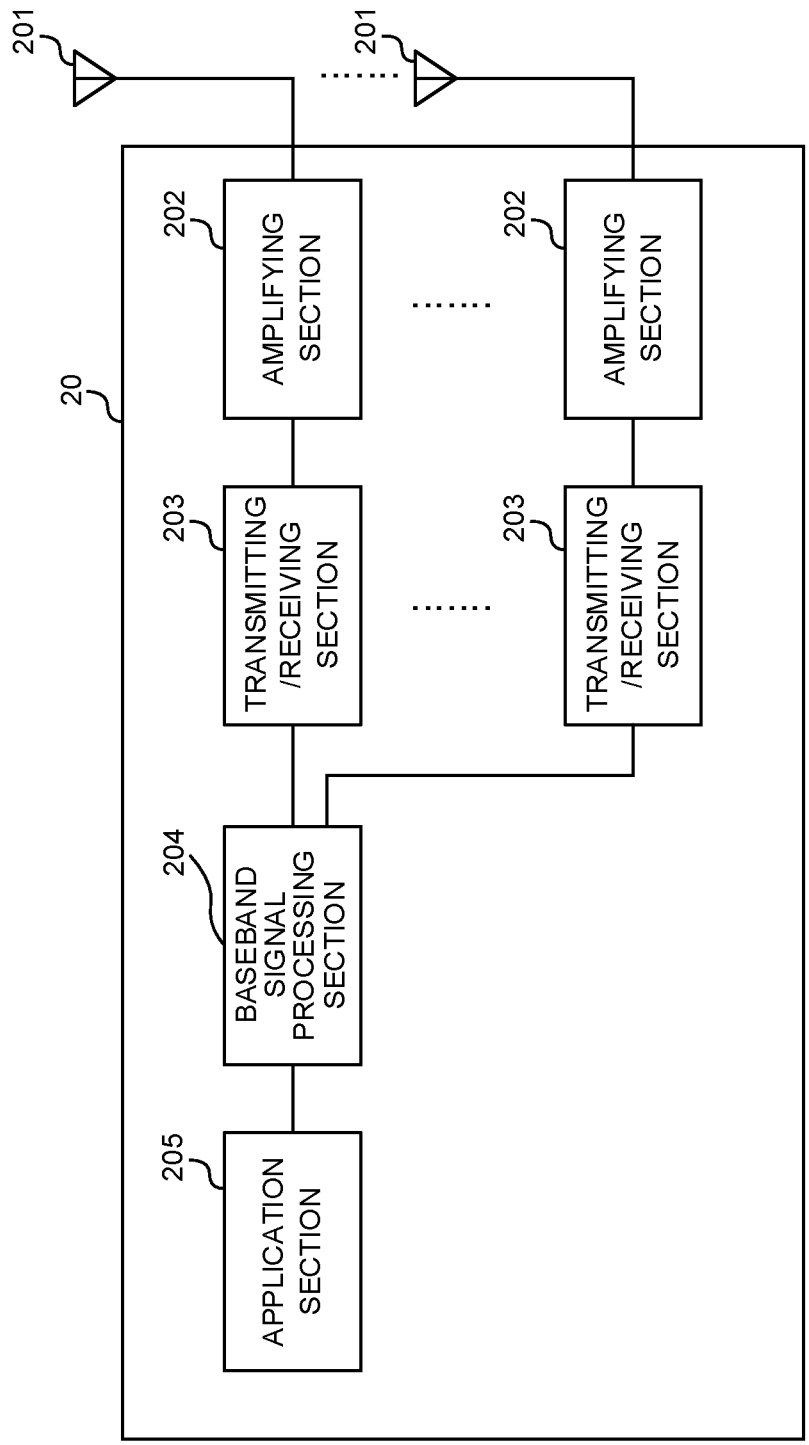
FIG. 13 is a diagram to show an exemplary overall structure of a user terminal according to the present embodiment.

FIG. 13 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. The user terminal 20 supports multiple RATs (for example LTE and NR).

Radio frequency signals that are received in a plurality of transmitting/receiving antennas 201 are each amplified in the amplifying sections 202. Each transmitting/receiving sections 203 receives the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving sections 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, at least one of DCI (DL assignment for scheduling DL data, and/or UL grant for scheduling UL data), DL data, and DL reference signal) by using an LTE DL carrier and/or an NR DL carrier. Also, the transmitting/receiving sections 203 transmit a plurality of UL signals (for example, at least one of UL data, UCI and a UL reference signal) of different RATs, at different times, by using the LTE UL carrier and the NR UL carrier, respectively.

The DL signals may include LTE DL signals and/or NR DL signals. The UL signals may include LTE UL signals and/or NR UL signals.

Also, the transmitting/receiving sections 203 transmit delivery acknowledgement information (also referred to as "ACK/NACK," "A/N," "HARQ-ACK," "A/N codebook," etc.) in response to DL signals (LTE DL signals and/or NR DL signals). As to how often this delivery acknowledgement information is transmitted, for example, the delivery acknowledgement information may be transmitted per CBG, per TB or for every one or more TBs (that is, ACKs or NACKs may be indicated per CBG, per TB or for every one or more TBs). In addition, the transmitting/receiving sections 203 may receive configuration information for the unit for retransmission of DL signals and/or UL signals.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as 1 transmitting/receiving section, or may be formed with a transmitting section and a receiving section.

Figure 14:
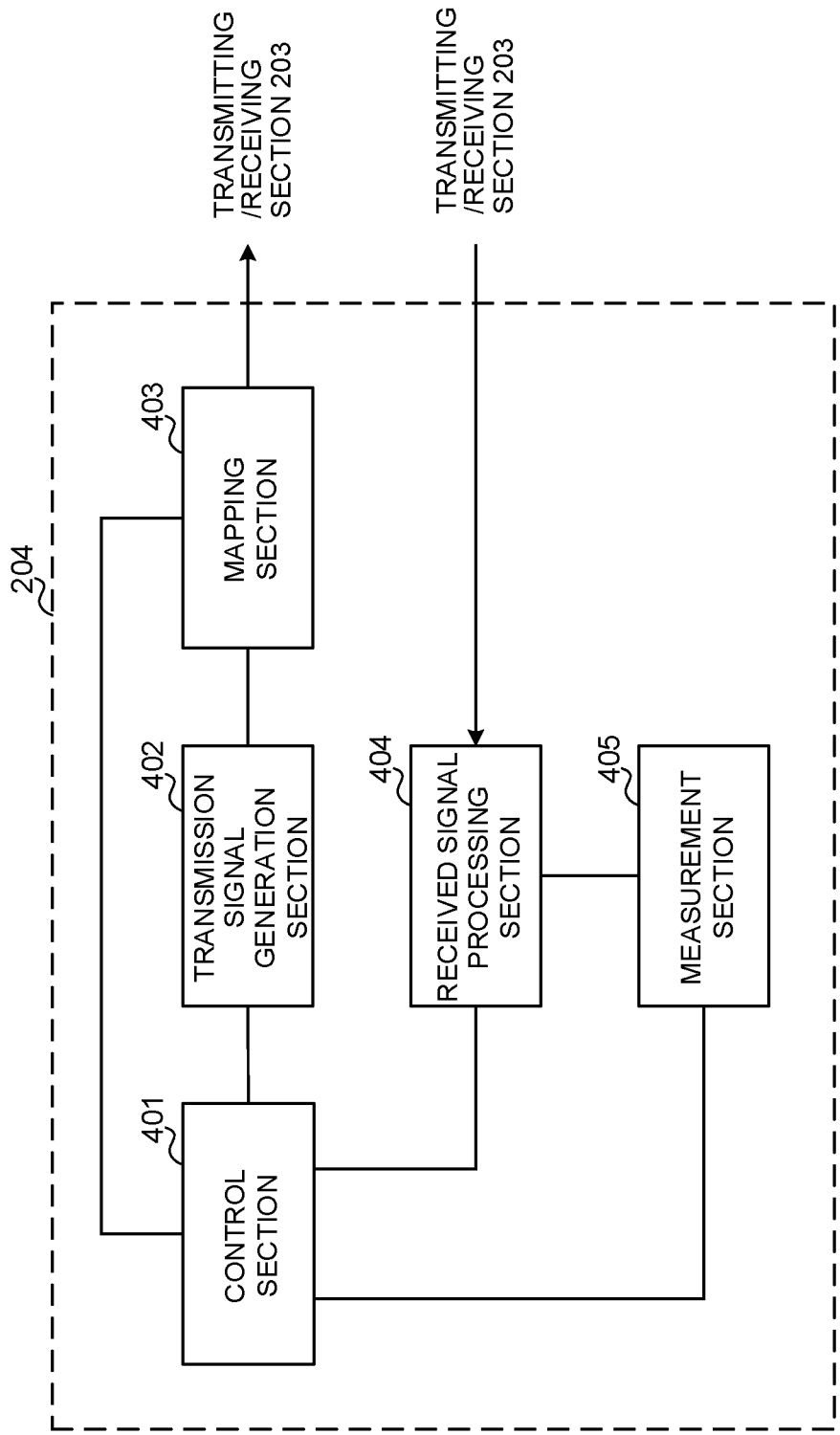
FIG. 14 is a diagram to show an exemplary functional structure of a user terminal according to the present embodiment.

FIG. 14 is a diagram to show an exemplary functional structure of a user terminal according to the present embodiment. Note that, although FIG. 14 primarily shows functional blocks that pertain to characteristic parts of the present embodiment, the user terminal 20 may have other functional blocks that are necessary for radio communication as well. Each MAC entity of the present embodiment may be constituted by at least one of the control section 401, a transmission signal generation section 402, and a received signal processing section 404.

As shown in FIG. 14, the baseband signal processing section 204 provided in the user terminal 20 has a control section 401, a transmission signal generation section 402, a mapping section 403, a received signal processing section 404 and a measurement section 405. Each MAC entity of the present embodiment may be constituted by at least one of a control section 301, a transmission signal generation section 302, and a received signal processing section 304.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

To be more specific, the control section 401 controls receiving processes for DL signals in the received signal processing section 404 (for example, demodulation, decoding, each carrier's demultiplexing, etc.) based on DCI (DL assignment).

Also, the control section 401 controls the generation and transmission processes (for example, encoding, modulation, mapping etc.) of UL signals based on DCI (UL grant).

The control section 401 also controls switching between the time to transmit LTE UL signals and/or receive LTE DL signals using an LTE carrier, and the time to transmit NR UL signals and/or receive NR DL signals using an NR carrier.

To be more specific, the control section 401 may control simultaneous connection with an LTE DL carrier, which is used to receive LTE DL signals, and an NR DL carrier, which is used to receive NR DL signals (see the first example and FIG. 3). The control section 401 may also control switching between the time to transmit LTE UL signals using the LTE UL carrier and the time to transmit NR UL signals using the NR UL carrier (see the first example and FIG. 3).

Also, when the LTE UL carrier and the LTE DL carrier are subject to frequency division duplexing (FDD), the control section 401 may determine at least one of the time to transmit LTE UL signals, the timing for transmitting delivery information in response to LTE DL signals, and the timing for scheduling LTE UL signals based on UL/DL configurations for use in time division duplexing (TDD) (see the first example and FIGS. 3 to 7).

Also, when the LTE UL carrier and the LTE DL carrier are subject to frequency division duplexing (FDD), the control section 401 may determine the time to transmit NR UL signals based on UL/DL configurations (see the first example and FIG. 3).

Also, the control section 401 may control a single connection with the LTE DL carrier, which is used to transmit LTE DL signals, or with the NR DL carrier, which is used to transmit NR DL signals, within a certain time (see the second example and FIG. 9).

The control section 401 may also control the granularity of retransmission of NR DL signals. For example, the control section 401 may control the granularity of NR A/N based on TBs, as with LTE A/N, or the control section 401 may control the granularity of NR A/N based on CBGs, unlike LTE A/N. Also, the control section 401 may control the bundling of NR A/N and/or LTE A/N.

Also, the control section 401 may also control the transmission power of UL signals. For example, the control section 401 may control the transmission power of LTE UL signals, transmitted in the LTE UL carrier, based on the path loss of the LTE carrier. Furthermore, the control section 401 may control the transmission power of NR UL signals, transmitted in the NR UL carrier, based on the path loss of the LTE carrier.

Also, the control section 401 may control the priority of UCI for LTE and/or UCI for NR.

The control section 401 can be constituted by a controller, a control circuit or control apparatus that can be described based on general understanding of the technical field to which the present invention pertains.

The transmission signal generation section 402 generates delivery acknowledgment information in response to UL signals and DL signals as commanded from the control section 401 (including performing encoding, rate matching, puncturing, modulation and/or other processes), and outputs this to the mapping section 403. The transmission signal generation section 402 can be constituted by a signal generator, a signal generation circuit or signal generation apparatus that can be described based on general understanding of the technical field to which the present invention pertains.

The mapping section 403 maps delivery acknowledgment information for UL signals and DL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes for DL signals (for example, demapping, demodulation, decoding, etc.). For example, the received signal processing section 404 may perform the decoding process on a per CB basis as commanded from the control section 401, and output the decoding result of each CB to the control section 401.

The received signal processing section 404 outputs the information received from the radio base station 10, to the control section 401. The received signal processing section 404 outputs, for example, broadcast information, system information, higher layer control information by higher layer signaling such as RRC signaling, L1/L2 control information (for example, UL grant, DL assignment, etc.) and so on to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting 2 or more physically and/or logically separate pieces of apparatus (via wire and/or wireless, for example) and using these multiple pieces of apparatus.

Figure 15:
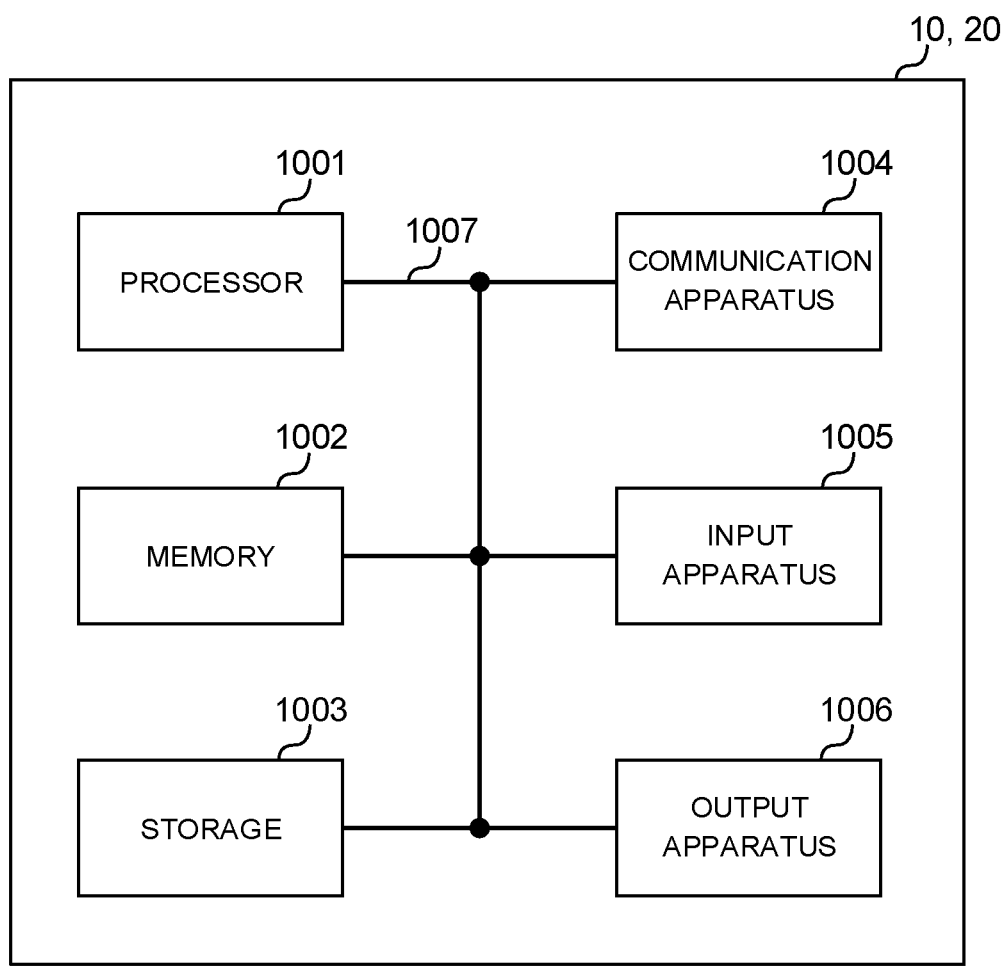
FIG. 15 is a diagram to show an exemplary hardware structure of a radio base station and a user terminal according to the present embodiment.

For example, the radio base station, user terminals and so on according to embodiments of the present invention may function as a computer that executes the processes of the radio communication method of the present invention. FIG. 15 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and user terminal 20 is implemented by allowing predetermined software (programs) to be read on hardware such as the processor 1001 and the memory 1002, and by a least one of allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Also, each device shown in FIG. 15 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain.

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and/or transmission power that can be used in each user terminal) to allocate to each user terminal in TTI units. Note that the definition of TTIs is not limited to this. The TTI may be the transmission time unit of channel-encoded data packets (transport blocks), code blocks and/or codewords, or may be the unit of processing in scheduling, link adaptation and so on. Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are simply examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the duration of symbols, the duration of cyclic prefixes (CPs) and so on can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "sides." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination thereof. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is b y no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:
1. A terminal comprising:
a processor that, when the terminal is configured with dual connectivity using a first radio access technique and a second radio access technique and a cell using frequency division duplexing (FDD) is configured for the first radio access technique, determines a transmission period in which physical random access channel (PRACH) transmission is enabled in the cell using the FDD, wherein the processor determines the transmission period, in which the PRACH transmission is enabled in the cell using the FDD, based on an uplink (UL)/downlink (DL) configuration; and a transmitter that transmits the PRACH using the transmission period in the cell using the FDD.

2. The terminal according to claim 1, wherein, when performing transmission of delivery acknowledgement information (HARQ-ACK) in the cell using the FDD, the processor controls the transmission of the HARQ-ACK by applying HARQ-ACK transmission procedure that is applied when TDD is a primary cell in TDD/FDD carrier aggregation.

3. The terminal according to claim 2, wherein a downlink control information (DCI) format to transmit in the cell using the FDD includes an HARQ process number defined in 4 bits.

4. The terminal according to claim 2, wherein a downlink control information (DCI) format to transmit in the cell using the FDD includes downlink assignment index (DAI).

5. The terminal according to claim 1, wherein a downlink control information (DCI) format to transmit in the cell using the FDD includes an HARQ process number defined in 4 bits.

6. The terminal according to claim 5, wherein the downlink control information (DCI) format to transmit in the cell using the FDD includes downlink assignment index (DAI).

7. The terminal according to claim 1, wherein a downlink control information (DCI) format to transmit in the cell using the FDD includes downlink assignment index (DAI).

8. A radio communication method for a terminal, comprising:

when the terminal is configured with dual connectivity using a first radio access technique and a second radio access technique and a cell using frequency division duplexing (FDD) is configured for the first radio access technique, determining a transmission period in which physical random access channel (PRACH) transmission is enabled in the cell using the FDD, wherein the terminal determines the transmission period, in which the PRACH transmission is enabled in the cell using the FDD, based on an uplink (UL)/downlink (DL) configuration; and transmitting the PRACH using the transmission period in the cell using the FDD.

9. A base station comprising:

a processor that, when dual connectivity using a first radio access technique and a second radio access technique is configured and a cell using frequency division duplexing (FDD) is configured for the first radio access technique, determines a transmission period in which physical random access channel (PRACH) transmission is enabled in the cell using the FDD, wherein the processor determines the transmission period, in which the PRACH transmission is enabled in the cell using the FDD, based on an uplink (UL)/downlink (DL) configuration; and a receiver that receives the PRACH that is transmitted using the transmission period in the cell using the FDD.

10. A system comprising a terminal and base station, wherein:

the terminal comprises:

a first processor that, when the terminal is configured with dual connectivity using a first radio access technique and a second radio access technique and a cell using frequency division duplexing (FDD) is configured for the first radio access technique, determines a transmission period in which physical random access channel (PRACH) transmission is enabled in the cell using the FDD, wherein the first processor determines the transmission period, in which the PRACH transmission is enabled in the cell using the FDD, based on an uplink (UL)/downlink (DL) configuration; and a transmitter that transmits the PRACH using the transmission period in the cell using the FDD, and the base station comprises:

a second processor that determines the transmission period; and a receiver that receives the PRACH that is transmitted at the transmission period in the cell using the FDD.

* * * * *